United States Patent

Wamprecht et al.

[11] Patent Number: 5,492,955
[45] Date of Patent: Feb. 20, 1996

[54] POWDER COATING COMPOSITIONS AND THEIR USE FOR COATING HEAT RESISTANT SUBSTRATES

[75] Inventors: Christian Wamprecht, Neuss; Hans-Josef Laas, Köln; Manfred Bock; Hans-Ulrich Meier-Westhues, both of Leverkusen; Wolfgang Schultz, Krefeld; Lothar Kahl, Bergisch Gladbach, all of Germany

[73] Assignee: Bayer Aktiengesellschaft, Leverkusen, Germany

[21] Appl. No.: 333,091

[22] Filed: Oct. 31, 1994

[30] Foreign Application Priority Data

Nov. 5, 1993 [DE] Germany ............ 43 37 855.2

[51] Int. Cl.$^6$ .................................................. C08F 8/00
[52] U.S. Cl. .................... 525/375; 525/327.3; 525/386
[58] Field of Search ........................... 525/375, 386

[56] References Cited

U.S. PATENT DOCUMENTS

| | | | |
|---|---|---|---|
| 3,730,930 | 5/1973 | Labana | 260/23 EP |
| 3,752,870 | 8/1973 | Labana | 260/836 |
| 3,781,379 | 12/1973 | Theodore et al. | 260/836 |
| 3,781,380 | 12/1973 | Labana et al. | 260/836 |
| 3,888,943 | 6/1975 | Labana et al. | 260/836 |
| 3,914,333 | 10/1975 | Labana et al. | 260/836 |
| 3,919,345 | 11/1975 | Labana et al. | 260/830 R |
| 3,932,367 | 1/1976 | Labana et al. | 260/78.4 D |
| 3,976,715 | 8/1976 | Labana et al. | 260/836 |
| 3,976,716 | 8/1976 | Labana et al. | 260/836 |
| 3,976,717 | 8/1976 | Labana et al. | 260/836 |
| 3,976,718 | 8/1976 | Labana et al. | 260/836 |
| 3,976,719 | 8/1976 | Labana et al. | 260/836 |
| 3,991,132 | 11/1976 | Siwiec et al. | 260/836 |
| 4,091,048 | 5/1978 | Labana et al. | 260/836 |
| 4,346,144 | 8/1982 | Craven | 428/335 |
| 4,374,954 | 2/1983 | Labana et al. | 525/207 |
| 4,463,154 | 7/1984 | Disteldorf et al. | 528/45 |
| 5,055,524 | 10/1991 | Pettit, Jr. et al. | 525/172 |

FOREIGN PATENT DOCUMENTS

| | | |
|---|---|---|
| 2064290 | 10/1992 | Canada . |
| 2064292 | 10/1992 | Canada . |
| 445639 | 9/1991 | European Pat. Off. . |
| 1-98672 | 4/1989 | Japan . |
| 1425690 | 2/1976 | United Kingdom . |
| 1424966 | 2/1976 | United Kingdom . |
| 1438429 | 6/1976 | United Kingdom . |

OTHER PUBLICATIONS

Chemical Abstracts, vol. 116 No. 10, Mar. 9, 1992, Abstract No. 85931 p. 125 & JP-A-3 221 567 (Nippon Oil and Fats KK).

*Primary Examiner*—Bernard Lipman
*Attorney, Agent, or Firm*—Joseph C. Gil; Thomas W. Roy

[57] ABSTRACT

A powder coating composition which is curable at 120° to 150° C. and contains A) one or more copolymers prepared from olefinically unsaturated monomers and containing epoxy groups and optionally hydroxyl groups, B) one or more curing agents containing carboxylic acid or carboxylic acid anhydride groups, and C) one or more polyaddition compounds which contain uretdione groups, have a melting point or range of 40° C. to 120° C. and are prepared from (cyclo)aliphatic diisocyanates; and its use for coating of heat-resistant substrates, especially automotive substrates.

18 Claims, No Drawings

POWDER COATING COMPOSITIONS AND THEIR USE FOR COATING HEAT RESISTANT SUBSTRATES

BACKGROUND OF THE INVENTION

1. Field of the Invention

The invention relates to a novel powder coating composition based on epoxy-functional copolymers of olefinically unsaturated monomers and acids or acid derivatives as curing agents, and to the use of these powder coating compositions for the coating of heat-resistant substrates, especially for the production of automotive finishes.

2. Description of the Prior Art

Powder coatings based on epoxy-functional copolymers containing carboxylic acids, especially dicarboxylic acids or dicarboxylic acid anhydrides, as curing agents are known (DE-AS 2,240,312, DE-AS 2,240,314, DE-OS 2,457,826 or U.S. Pat. No. 4,091,048).

Copolymers containing not only epoxy groups but also other functional groups, e.g., hydroxyl, anhydride or amide groups, can also be used for the preparation of powder coatings (cf. e.g. DE-OS 2,441,624, DE-OS 2,441,752, DE-OS 2,441,753, DE-OS 2,457,827, DE-OS 2,457,894, DE-OS 2,509,410, U.S. Pat. No. 3,932,367, U.S. Pat. No. 3,991,132, U.S. Pat. No. 4,374,954).

The powder coatings described in said publications were developed especially for automotive finishes. However, with regard to solvent resistance and chemical resistance, the resulting coatings do not fully satisfy the appropriate practical requirements.

There have been many attempts to improve the inadequate solvent resistance of powder coatings based on epoxy-functional polyacrylates and dicarboxylic acids or their mono- or poly-anhydrides. EP-A-0,299,420 describes polyanhydride crosslinking agents based on aliphatic dicarboxylic acids having 3 to 20 carbon atoms, modified with diols or polyols. Corresponding powder coating compositions with epoxy-functional polyacrylates as binders produce coatings which have good flow properties but which do not possess the necessary resistance to chemicals at the low stoving temperatures of about 140° C. demanded in practice.

EP-A-0,509,392 and EP-A-0,509,393 describe powder coating compositions based on epoxy-functional copolymers and aliphatic or cycloaliphatic carboxylic acids, their anhydrides or polyol-modified anhydrides of dibasic acids. An essential feature of both these inventions is the low stoving temperature of 120° C. which can be achieved. It is disclosed that this is attributable in the case of EP-A-0,509,392 to a content of tert-butyl acrylate or tert-butyl methacrylate of 5 to 50% by weight, and in the case of EP-A-0,509,393 to a content of styrene of 35 to 50% by weight in the epoxy-functional copolymer.

U.S. Pat. No. 4,346,144 describes powder coating compositions containing A) epoxy-functional copolymers, B) aliphatic dicarboxylic acids having 8 to 18 carbon atoms as crosslinking agents, and C) an additional crosslinking component capable of reacting with hydroxyl or carboxyl groups. Examples are alkylated melamine-formaldehyde resins, alkylated glycoluril resins, aliphatic glycidyl ethers and cycloaliphatic diepoxides. Blocked polyisocyanates are also mentioned as additional crosslinking agents in the text and in several examples.

For reasons of environmental protection, however, it is desirable to prepare coatings which are completely free of emissions, regardless of whether they are solvents or decomposition products, such as blocking agents.

Therefore, it is an object of the present invention to provide a novel powder coating composition which does not suffer from said disadvantages of the state of the art, i.e., a composition which can be cured at temperatures below 160° C. to give a smooth-flowing, elastic, high-gloss film resistant to solvents and chemicals.

This object may be achieved by the preparation of the powder coating compositions according to the invention, which are described in greater detail below. The novel powder coating compositions are characterized by the presence of polyaddition products containing uretdione groups as an additional curing component.

The realization that the object of the invention can be achieved by the use of crosslinking components containing uretdione groups can be regarded as surprising because it has previously been recommended that powder coating compositions containing curing agents having uretdione groups should be cured at temperatures above 160° C., preferably above 170° C. (cf. the examples of EP-A-0,045,994 and EP-A-0,045,998).

SUMMARY OF THE INVENTION

The present invention relates to a powder coating composition, which may be cured at temperatures of 120° to 150° C. to provide a coating that is non-yellowing, elastic, and resistant to solvents and chemicals, containing A) a binder component containing one or more copolymers which are prepared from olefinically unsaturated monomers, contain epoxy groups and optionally hydroxyl groups and have an epoxy equivalent weight of 365 to 2840, a glass transition temperature Tg of 20° to 100° C. and a weight average molecular weight of 1500 to 30,000, B) a curing component having a melting point or range of 40° to 130° C. and containing one or more compounds selected from (i) (cyclo)aliphatic dicarboxylic acids having 4 to 20 carbon atoms, (ii) monomeric and/or polymeric anhydrides of such dicarboxylic acids, (iii) polyol-modified polymeric anhydrides of such dicarboxylic acids, and (iv) aliphatic hydroxycarboxylic acids having 4 to 18 carbon atoms and C) one or more polyaddition compounds which contain uretdione groups, have a melting point or range of 40° C. to 125° C. and are prepared from (cyclo)aliphatic diisocyanates, provided that components A), B) and C) are present in proportions such that there are 0.5 to 1.5 carboxyl and/or anhydride groups of component B) and 0.1 to 1.2 uretdione groups of component C) for each epoxy group of component A).

The invention also relates to the use of this powder coating for the production of coatings on heat-resistant substrates, especially for the production of automotive finishes.

DETAILED DESCRIPTION OF THE INVENTION

Binder component A) is selected from copolymers of olefinically unsaturated compounds with epoxy groups and optionally hydroxyl groups. The epoxy equivalent weight of the copolymers present in component A) is 365 to 2840, preferably 430 to 1420. The content of hydroxyl groups in the copolymers is 0 to 3%, preferably 0 to 2.2% by weight.

The copolymers present in binder component A) also have a glass transition temperature Tg of 20° to 100° C., preferably 30 to 90° C., and a weight average molecular weight of 1500 to 30,000, preferably 2000 to 20,000. The molecular weights may be determined by gel permeation chromatography using polystyrene as the standard.

The copolymers present in component A) preferably contain (ii) 0 to 20 parts by weight, preferably 0 to 15 parts by weight, of hydroxy-functional, olefinically unsaturated compounds, and (iii) 45 to 95 parts by weight, preferably 40 to 90 parts by weight, of other, non-functional, olefinically unsaturated compounds, wherein the sum of the parts by weight of components (i) to (iii) is 100.

Monomers (ii) are preferably hydroxyalkyl acrylates or methacrylates having 2 to 8, preferably 2 to 4, carbon atoms in the hydroxyalkyl radical, e.g., hydroxyethyl acrylate or methacrylate, hydroxypropyl acrylate or methacrylate (especially the addition products of propylene oxide and acrylic or methacrylic acid), 2- or 4-hydroxybutyl acrylate or methacrylate, and mixtures of these monomers. Other suitable monomers (ii) are reaction products of said monomers with ε-caprolactone or monoepoxides such as ethylene oxide and/or propylene oxide.

Examples of monomers (iii) are vinylaromatics such as styrene, vinyltoluene and α-methylstyrene and alkyl acrylates or methacrylates having 1 to 18, preferably 1 to 8, carbon atoms in the alkyl radical. Examples include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, 2-ethylhexyl (meth)acrylate, neopentyl (meth)acrylate and stearyl methacrylate, other (meth)acrylic acid esters such as the cyclohexyl, isobornyl, 3,3,5-trimethylcyclohexyl, phenyl, benzyl or 2-phenyl esters of these acids. Also suitable are di(cyclo)-alkyl maleates or fumarates having 1 to 8 carbon atoms in the alkyl radicals, e.g., dimethyl maleate, diethyl maleate, diisopropyl maleate, diisobutyl maleate, ditert-butyl maleate, dicyclohexyl maleate and the corresponding dialkyl fumarates.

The copolymers present in component A) can be prepared using any mixtures of monomers (i) to (iii) meeting the requirements indicated above, provided that the resulting copolymers have contents of epoxy groups and hydroxyl groups and glass transition temperatures within the above-mentioned ranges.

This condition essential for the copolymers to be usable according to the invention is satisfied if the copolymers are prepared using a suitable ratio of "softening" monomers, which lower the glass transition temperature of the copolymers, to "hardening" monomers, which raise the glass transition temperature.

Examples of "softening" monomers include alkyl acrylates such as ethyl acrylate, n-butyl acrylate, isobutyl acrylate and 2-ethylhexyl acrylate.

Examples of "hardening" monomers include alkyl methacrylates such as methyl methacrylate, ethyl methacrylate, isobutyl methacrylate, cyclohexyl methacrylate, isopropyl methacrylate, tert-butyl methacrylate, neopentyl methacrylate, isobornyl methacrylate and 3,3,5-trimethylcyclohexyl methacrylate; and vinylaromatics such as styrene, vinyltoluene and α-ethylstyrene.

Copolymers A) are prepared by the free-radical polymerization of the above-mentioned monomers in suitable organic solvents. The monomers are polymerized at temperatures of 60° to 200° C., preferably 80° to 180° C., in the presence of radical-forming agents and optionally molecular weight regulators.

The copolymers are preferably prepared in inert organic solvents. Examples of suitable solvents are aromatic solvents such as toluene or xylene; esters such as ethyl acetate or butyl acetate; ketones such as acetone, methyl ethyl ketone or methyl isobutyl ketone; and mixtures of these solvents.

The copolymers can be prepared continuously or batchwise. Conventionally, the monomer mixture and the initiator are metered uniformly and continuously into a polymerization reactor and the corresponding amount of polymer is continuously withdrawn simultaneously. Chemically almost pure copolymers can preferably be prepared in this way. Chemically almost pure copolymers can also be prepared by introducing the reaction mixture into a stirred vessel at a constant rate without withdrawing the polymer.

A further possibility is to place some of the monomers, preferably dialkyl maleates, into the reactor as the sole reaction medium or mixed with solvents of the type mentioned, and to introduce the remaining monomers and auxiliary substances into this reactor, separately or together, at the reaction temperature. In general, the polymerization is carried out under atmospheric pressure, although it can also be carried out at pressures up to 25 bar. The initiators are used in amounts of 0.05 to 12% by weight, preferably 0.1 to 10% by weight, based on the total amount of monomers.

Suitable initiators are known free-radical initiators, e.g., aliphatic azo compounds such as azodiisobutyronitrile, azo-bis-2-methylvaleronitrile, 1,1'-azo-bis-1-cyclohexanenitrile and alkyl 2,2'-azo-bis-isobutyrates; symmetrical diacyl peroxides such as acetyl, propionyl or butyryl peroxide, benzoyl peroxides substituted by bromo, nitro, methyl or methoxy groups, and lauryl peroxides; symmetrical peroxydicarbonates such as diethyl, diisopropyl, dicyclohexyl and dibenzoyl peroxydicarbonate; tert-butyl peroxy-2-ethylhexanoate and tert-butyl perbenzoate; hydroperoxides such as tert-butyl hydroperoxide and cumene hydroperoxide; and dialkyl peroxides such as dicumyl peroxide, tert-butyl cumyl peroxide or ditert-butyl peroxide.

The molecular weight of the copolymers can be regulated using conventional regulators in the preparation. Examples include tertdodecylmercaptan, n-dodecylmercaptan or mercaptoethanol. The regulators can be added in amounts of 0.1 to 8% by weight, preferably 0.1 to 4% by weight, based on the total amount of monomers.

This procedure gives organic solutions of the copolymers, which, by evaporation of the solvent, can be isolated as ready-to-use solids with the above-mentioned glass transition temperature and content of functional groups.

In this process, the solvent or solvent mixture is removed as completely as possible and normally down to a residual content of ≦2% by weight, preferably ≦1% by weight, for example by spray drying, degassing in evaporation extruders or distillation, optionally under vacuum.

In the case of a solventless procedure, the copolymers are obtained as viscous melts stirrable at temperatures ≧120° C., which are granulated after cooling and solidification.

The curing component B) contains at least one component selected from (i) aliphatic and/or cycloaliphatic dicarboxylic acids having 4 to 20 carbon atoms, (ii) monomeric or polymeric anhydrides of such acids, (iii) polyol-modified polymeric anhydrides of such acids, and (iv) hydroxy-carboxylic acids, the latter preferably being used exclusively in admixture with anhydrides (ii) and/or (iii).

Examples of dicarboxylic acids (i) include succinic acid, glutaric acid, adipic acid, pimelic acid, suberic acid, azelaic acid, sebacic acid, dodecanedioic acid (decane-1,10-dicarboxylic acid) or hexahydrophthalic acid.

Examples of monomeric anhydrides (ii) of such acids are succinic, glutaric or hexahydrophthalic anhydride. Examples of polymeric anhydrides (ii) of such acids are those obtained by intermolecular condensation of said acids or mixtures thereof. Examples include adipic (poly)anhydride, azelaic (poly)anhydride, sebacic (poly)anhydride and dodecanedioic (poly)anhydride. The weight average molecular weight of these polyanhydrides (which may be determined by gel permeation chromatography using polystyrene as the standard) is generally 500 to 5000 preferably 1000 to 5000. The polyanhydrides are prepared for example by reacting the dicarboxylic acids or dicarboxylic acid mixtures with acetic anhydride at temperatures of 120° to 200° C., preferably 120° to 170° C. The acetic acid eliminated in this process is removed, for example, by vacuum distillation.

The polyol-modified anhydrides (iii) are preferable, especially those obtained according to EP-A-0,299,420. The molar ratio of anhydride groups to carboxyl groups in these polyol-modified polyanhydrides is generally 0.04:1 to 5:1, preferably 1:1 to 3:1.

Components (iv) are preferably hydroxycarboxylic acids having a melting point between 40° and 150° C. Examples include 2-hydroxyisobutyric acid (81° C.), 2-hydroxyhexanoic acid (61° C.), 10-hydroxydecanoic acid (76° C.), 12-hydroxydodecanoic acid (86° C.), 16-hydroxyhexadecanoic acid (98° C.) and 12-hydroxyoctadecanoic acid (80° C.).

These hydroxycarboxylic acids are generally used only in combination with polyanhydrides (ii) or (iii), preferably (ii), in amounts of at most 50% by weight, based on the weight of polyanhydrides.

Most preferably, curing component B) is exclusively selected from dicarboxylic acids (i) and monomeric or polymeric anhydrides (ii).

The curing component B) is used in amounts such that the total molar ratio of carboxyl and anhydride groups to epoxy groups is 0.5:1 to 1.5:1, preferably 0.8:1 to 1.2:1.

The additional curing component C), which is an essential feature of the invention, is selected from polyaddition compounds which contain uretdione groups and are prepared from aliphatic and/or cycloaliphatic diisocyanates, preferably 1,6-hexamethylene diisocyanate (HDI), 1-isocyanato-3,3,5-trimethyl-5-isocyanatomethyl-cyclohexane (isophorone diisocyanate, IPDI), 4,4'-diisocyanatodicyclohexylmethane and mixtures of these diisocyanates.

The preparation of such polyaddition compounds by reacting polyisocyanates containing uretdione groups with difunctional and optionally monofunctional compounds which are reactive towards isocyanate groups, especially monohydric or dihydric alcohols optionally containing ester groups is known and is described for example in DE-OS 2,420,475, EP-A-0,045,996 and EP-A-0,045,998. The polyaddition compounds containing uretdione groups which can be used as curing agents C) generally have a content of uretdione groups (calculated as $C_2N_2O_2$, molecular weight= 84) of 3 to 16% by weight. The melting point of these compounds is generally in the range of 40° to 125° C.

Particularly preferred curing agents C) containing uretdione groups are those which have a content of free isocyanate groups of 0 to 2% by weight, a content of uretdione groups of 3 to 16% by weight, a content of urethane groups (calculated as $CHNO_2$, molecular weight=59) of 10 to 22% by weight, a content of carboxylic acid ester groups (calculated as $CO_2$, molecular weight=44) of 0 to 20% by weight and/or a content of carbonate groups (calculated as $CO_3$, molecular weight=60) of 0 to 25% by weight, provided that the total content of carboxylic acid ester and carbonate groups is at least 1% by weight. Such polyaddition compounds containing uretdione groups are prepared in accordance with the teaching of German Patent Application P 43 27 573.7 by reacting I) polyisocyanates containing uretdione groups and having an average isocyanate functionality of 2.0 and II) optionally up to 70% by weight, based on the total weight of components I) and II), of other diisocyanates with III) diols containing ester groups and/or carbonate groups and having an average molecular weight of 134 to 1200, IV) optionally up to 80% by weight, based on the total weight of components III) and IV), of diols which are free of ester groups and carbonate groups and have a molecular weight of 62 to 300, and V) optionally up to 40% by weight, based on the total weight of components III), IV) and V), of other compounds which have monofunctional reactivity towards isocyanate groups, wherein the equivalent ratio of isocyanate groups to isocyanate-reactive groups is 1.2:1 to 0.6:1.

Curing component C) is used in the powder coating compositions according to the invention in amounts such that there are 0.1 to 1.2, preferably 0.2 to 1.0, uretdione groups per epoxy group of component A).

Examples of auxiliary additives D) which may optionally be used in the coating compositions according to the invention include catalysts such as tin(II) hexanoate, tin(II) octanoate, tin(II) laurate, dibutyltin oxide, dibutyltin chloride, dibutyltin diacetate, dibutyltin dilaurate, dibutyltin maleate, dioctyltin diacetate, 1,4-diazabicyclo[2,2,2]octane, 1,5-diazabicyclo[4,3,0]non-5-ene and 1,8-diazabicyclo[5,4,0]undec-7-ene. Catalyst mixtures may also be used. Other suitable catalysts and details concerning the mechanisms of such catalysts are described in Kunststoff Handbuch (Plastics Handbook), volume VII, edited by Vieweg and Höchtlen, Carl-Hanser-Verlag, Munich 1966, e.g. on pages 96 to 102. Catalysts D) are used, if at all, in amounts of 0.1 to 5% by weight, preferably 0.1 to 3% by weight, based on the weight of components A), B) and C).

Examples of other auxiliary substances and additives D) are levelling agents such as polybutyl acrylate or those based on polysilicones; light stabilizers such as sterically hindered amines; UV absorbers such as benzotriazoles or benzophenones; and pigments such as titanium dioxide.

Other additives D) include color stabilizers for counteracting the risk of yellowing due to overstoving. Particularly suitable color stabilizers are trialkyl and/or triaryl phosphites optionally containing inert substituents, such as triethyl phosphite, triphenyl phosphite or, preferably, trisalkylphenyl phosphites wherein the alkyl substituents have 6 to 12 carbon atoms. Trisnonylphenyl phosphite (a technical-grade product containing an ester of phosphorous acid with the addition product of tripropylene and phenol), particularly, is very preferred.

One embodiment for preparing the ready-to-use powder coating compositions is to mix the individual components together after they have been pulverized. In this embodiment, the individual powder particles would contain the individual components A), B), C) and optionally D). In the preferred method of preparing the powder coating compositions, however, the constituents A), B), C) and optionally D) are intimately mixed together and combined to form a homogeneous material, e.g., in extruders or kneaders at temperatures above the melting range of the individual components, for example at 70° to 120° C. The solid which results after the melt has cooled is then ground and sieved to remove particles larger than the desired size, for example larger than 0.1 mm. This gives "mixed powders", in which each individual powder particle contains the individual components A), B), C) and optionally D).

The choice of the order in which to combine the individual components A) to D) is substantially unrestricted.

As previously explained above, the proportions of the individual components A), B) and C) are also chosen so that there are 0.5 to 1.5, preferably 0.8 to 1.2, carboxyl and/or anhydride groups of component B) and 0.1 to 1.2, preferably 0.2 to 1.0, uretdione groups of component C) per epoxy group of component A).

The powder coating formulations prepared in this way can be applied by conventional powder application processes, e.g., electrostatic powder spraying or whirl sintering, to the substrates to be coated. The coatings may be cured by heating at temperatures of 120° to 200° C., preferably 120° to 150° C., for a period of 10 to 60 minutes, preferably 10 to 30 minutes. The resulting coatings are hard, clear, glossy and elastic, have good flow properties and outstanding anti-corrosion properties, and especially have very good solvent resistance even at low stoving temperatures of 130° to 150° C. over a period of 30 minutes.

According to the invention, any heat-resistant substrates can be coated, for example, substrates made of glass, metals, wood or plastics. The powder coating compositions according to the invention are preferably used for the production of coatings on car bodies, especially for the production of automotive finishes.

Unless indicated otherwise, the parts and percentages given in the following examples are by weight.

EXAMPLES

I. Epoxy-functional polyacrylates A)

1. Epoxy-functional polyacrylate A1

1316 g of xylene were placed in a 5 l stainless steel pressurized reactor and heated to 145° C. A monomer mixture containing 798 g of glycidyl methacrylate, 764 g of methyl methacrylate, 190 g of styrene and 190 g of n-butyl acrylate, and an initiator solution containing 170 g of a 70% solution of tert-butyl peroxy-2-ethylhexanoate in isododecane, were then metered in through separate feed inlets over 2 hours, starting together. The reaction mixture was then stirred for a further 2 hours at 145° C. The solvent was subsequently distilled off under vacuum and the resin melt was run off into sheet aluminium dishes and dried to constant weight in a vacuum drying cabinet at 140° C. and under a vacuum of about 0.1 mbar. The resulting product was a colorless solid resin having a solids content of 99.4%, a glass transition temperature $T_g$ of 23.3° C., a weight average molecular weight of 4500 and an epoxy equivalent weight of about 375 g/mol epoxy group.

2. Epoxy-functional polyacrylate A2

Amatex PD 7610, a commercial product from Mitsui Toatsu, epoxy equivalent weight 535 g/mol epoxy group, Mw: 7000, Tg: 50.6° C.

II. Carboxyl-functional or anhydride-functional crosslinking agents B)

1. Polyanhydride crosslinking agent B1

988 g of dodecanedioic acid and 308 g of acetic anhydride were weighed out in a 3 l three-necked flask equipped with a stirrer, distillation attachment and thermometer, and heated to 150° C. The acetic acid formed was distilled off. In the course of the distillation, the temperature was raised to 170° C. and the acetic acid was distilled off completely through the additional application of a vacuum. The temperature was then lowered to 100° C. and the still liquid product was poured into a sheet aluminium dish to cool and solidify. The product was a solid melting at 85° C.

2. Dicarboxylic acid B2

Dodecanedioic acid

3. Dicarboxylic add B3

Sebacic acid

III. Curing agent C) containing uretdione groups a) Preparation of a diol containing ester groups:

901 g of butane-1,4-diol and 1712 g of ε-caprolactone were mixed at room temperature under a nitrogen atmosphere, 0.3 g of tin(II) octoate was added and the mixture was then heated for 5 hours at 160° C. After cooling to room temperature, a colorless liquid product was obtained which had the following characteristics:

η(23° C.): 180 mPa.s

OH number: 416 mg KOH/g free caprolactone: 0.2% average molecular weight (calc. from OH number): 269 content of ester groups (calc.): 25.3% b) Preparation of the curing agent C) containing ester groups and uretdione groups:

1000 g (4.3 equiv) of a polyisocyanate containing uretdione groups, based on 1-isocyanato-3,3,5-trimethyl-5-isocyanatomethylcyclohexane ("IPDI"), and having a content of free isocyanate groups of 17.9% and a content of uretdione groups (determined by hot titration) of 19.1%, were heated to 80° C. under dry nitrogen. A mixture of 457 g (3.4 equiv) of diol a) containing ester groups, and 117 g (0.9 equiv) of 2-ethylhexan-1-ol was then added over 30 min. and the reaction mixture was stirred at a maximum reaction temperature of 105° C. until its NCO content had dropped to a value of 0.7% after about 2 h.

The melt was poured onto a metal sheet to cool and a practically colorless solid resin was obtained which had the following characteristics:

NCO content: 0.7% content of uretdione groups (calc.): 12.1% total NCO content: 12.8% melting point: 82° to 83° C.

Use Examples

The components used were thoroughly mixed and then homogenized on a type PLK 46 co-kneader from Buss AG, Basle. The housing temperature was 40° C. in the feed section and 50° C. in the processing section. The kneader shaft rotated at 150 rpm. The mixture was extruded twice in order to achieve optimal thorough mixing. The solidified melts were ground to powder coating compositions with a particle size of <90 μm by means of a type ACM 2 classifier mill from Hosokawa-Mikropul, Cologne. The powder coating compositions were sprayed onto degreased steel sheets with an electrostatic cup gun from ESB, a high voltage of 70 kV (−) being applied. Curing took place within 30 minutes at 140° C. and 150° C. in a gradient oven from Byk.

Compositions of the powder coating compositions according to the invention
(Examples 1–6) and the comparative powder coating compositions
(Comparative Examples V1–V4); amounts in parts by weight

| Example | V1 | 1 | V2 | V3 | 2 | V4 | 3 | 4 | 5 |
|---|---|---|---|---|---|---|---|---|---|
| Polyacrylate A1 | — | — | — | — | — | 75.7 | 67.3 | — | — |
| Polyacrylate A2 | 83.3 | 74.0 | 81.5 | 80.7 | 72.4 | — | — | 73.4 | 50.4 |
| Crosslinking agent B1 | — | — | — | — | — | 23.3 | 20.7 | 14.6 | |
| Crosslinking agent B2 | — | — | 17.5 | 17.3 | 15.6 | — | — | — | 10.9 |
| Crosslinking agent B3 | 15.7 | 14.0 | — | — | — | — | — | — | — |
| Curing agent C | — | 10.0 | | — | 10.0 | — | 10.0 | 10.0 | 7.0 |
| Tin (II) dioctoate | — | 1.0 | — | 1.0 | 1.0 | — | 1.0 | 1.0 | 0.7 |
| Levelling agent* | 1.0 | 1.0 | 1.0 | 1.0 | 1.0 | 1.0 | 1.0 | 1.0 | — |
| Levelling agent** | — | — | — | — | — | — | — | — | 1.0 |
| Titanium dioxide*** | — | — | — | — | — | — | — | — | 30.0 |

*Perenol F30 P, a commercial polyacrylate lvelling agent from Henkel
**Modaflow PIII, a commercial polybutyl acrylate levelling agent from Monsanto
***Bayertitan R-KB-4, a commercial pigment from Bayer AG Test results of the powder coatings according to the invention (Examples 1–6) and
the comparative powder coatings (Comparative Examples V1–V4)

| Example | V1 | 1 | V2 | V3 | 2 | V4 | 3 | 4 | 5 |
|---|---|---|---|---|---|---|---|---|---|
| 1. Stoving conditions: 30 minutes, 140° C. | | | | | | | | | |
| Cupping index (mm)* | 1.5 | 9.0 | 4.6 | 4.0 | 7.8 | 9.0 | 8.6 | 8.5 | 7.5 |
| Acetone test** | 2m | 0–1 | 2m | 2m | 0–1 | <35 | 0–1 | 0–1 | 0–1 |
| Gloss (20°/60°) | 89/103 | 85/101 | 86/102 | 86/100 | 87/100 | 89/101 | 86/100 | 88/101 | 38/80 |
| 2. Stoving conditions: 30 minutes, 150° C. | | | | | | | | | |
| Cupping index (mm)* | 5.5 | 8.1 | >9 | 8.8 | 7.8 | 9.0 | 8.7 | 7.9 | 7.4 |
| Acetone test** | 2m | n | 2m | 2m | n | 2m | n | n | 0–1 |
| Gloss (20°/60°) | 87/102 | 85/101 | 86/102 | 86/100 | 87/100 | 89/101 | 86/97 | 88/101 | 40/84 |

*DIN 53156
**Acetone: The coating was rubbed up and down 50 times with an impregnated swab. After a regeneration time of 5 minutes, the rubbed area was assessed as follows: n = normal, 0–1 = surface slightly softened, 2 = film swollen down to primer, m = matt. When cured at 140° C., the coating of Comparison Example V4 was removed before the 50 rubs were completed.

Although the cupping index of the coating of Comparative Example V 4 is good, the resistance to acetone is too bad for any practical use. Compared with the coatings of Comparative Examples V1 to V4, the coatings of Examples 1, 2, 3, 4 and 5 have a markedly higher resistance to the effect of acetone. This is surprising in view of the teachings of the prior art (Examples of EP-A-0,045,998) that curing agents containing uretdione groups do not react with hydroxyl groups (formed by the reaction between epoxy and carboxyl groups) under the applied stoving conditions of 140° and 150° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A powder coating composition, which may be cured at temperatures of 120° to 150° C. to provide a coating that is non-yellowing, elastic, and resistant to solvents and chemicals, comprising A) a binder component containing one or more copolymers which are prepared from olefinically unsaturated monomers, contain epoxy groups and optionally hydroxyl groups and have an epoxy equivalent weight of 365 to 2840, a glass transition temperature Tg of 20° to 100° C. and a weight average molecular weight of 1500 to 30,000, B) a curing component having a melting point or range of 40° to 130° C. and containing one or more compounds selected from (i) (cyclo)aliphatic dicarboxylic acids having 4 to 20 carbon atoms, (ii) monomeric and/or polymeric anhydrides of such dicarboxylic acids, (iii) polyol-modified polymeric anhydrides of such dicarboxylic acids, and (iv) aliphatic hydroxycarboxylic acids having 4 to 18 carbon atoms and C) one or more polyaddition compounds which contain uretdione groups, have a melting point or range of 40° C. to 125° C. and are prepared from (cyclo)aliphatic diisocyanates, provided that components A), B) and C) are present in proportions such that there are 0.5 to 1.5 carboxyl and/or anhydride groups of component B) and 0.1 to 1.2 uretdione groups of component C) for each epoxy group of component A).

2. The powder coating composition of claim 1 wherein component C) comprises one or more polyaddition compounds having a) a content of free isocyanate groups (calculated as NCO, molecular weight=42) of 0 to 2% by weight, b) a content of uretdione groups (calculated as $C_2N_2O_2$, molecular weight=84) of 3 to 16% by weight, c) a content of urethane groups (calculated as $CHNO_2$, molecular weight=59) of 10 to 22% by weight, d) a content of carboxylic acid ester groups (calculated as $CO_2$, molecular weight=44) of 0 to 20% by weight and e) a content of carbonate groups (calculated as $CO_3$, molecular weight=60) of 0 to 25% by weight, provided that the total content of carboxylic acid ester and carbonate groups in the polyaddition compound is at least 1% by weight.

3. The powder coating composition of claim 1 wherein said copolymers are the reaction product of
   (i) 5 to 35 parts by weight of glycidyl acrylate and/or glycidyl methacrylate,
   (ii) 0 to 20 parts by weight of one or more hydroxyalkyl acrylates and/or methacrylates having 2 to 4 carbon atoms in the alcohol radical, and/or their reaction products with ε-caprolactone or monoepoxides, and
   (iii) 45 to 95 parts by weight of non-functional, olefinically unsaturated compounds,
wherein the sum of (i) to (iii) is 100.

4. The powder coating composition of claim 2 wherein said copolymers are the reaction product of
   (i) 5 to 35 parts by weight of glycidyl acrylate and/or glycidyl methacrylate,
   (ii) 0 to 20 parts by weight of one or more hydroxyalkyl acrylates and/or methacrylates having 2 to 4 carbon atoms in the alcohol radical, and/or their reaction products with ε-caprolactone or monoepoxides, and
   (iii) 45 to 95 parts by weight of non-functional, olefinically unsaturated compounds,
   wherein the sum of (i) to (iii) is 100.

5. The powder coating composition of claim 1 wherein component b) comprises one or more saturated aliphatic dicarboxylic acids having 4 to 12 carbon atoms.

6. The powder coating composition of claim 2 wherein component b) comprises one or more saturated aliphatic dicarboxylic acids having 4 to 12 carbon atoms.

7. The powder coating composition of claim 3 wherein component b) comprises one or more saturated aliphatic dicarboxylic acids having 4 to 12 carbon atoms.

8. The powder coating composition of claim 4 wherein component b) comprises one or more saturated aliphatic dicarboxylic acids having 4 to 12 carbon atoms.

9. The powder coating composition of claim 1 wherein component B) comprises one or more monomeric and/or polymeric anhydrides of aliphatic dicarboxylic acids having 4 to 12 carbon atoms.

10. The powder coating composition of claim 2 wherein component B) comprises one or more monomeric and/or polymeric anhydrides of aliphatic dicarboxylic acids having 4 to 12 carbon atoms.

11. The powder coating composition of claim 3 wherein component B) comprises one or more monomeric and/or polymeric anhydrides of aliphatic dicarboxylic acids having 4 to 12 carbon atoms.

12. The powder coating composition of claim 4 wherein component B) comprises one or more monomeric and/or polymeric anhydrides of aliphatic dicarboxylic acids having 4 to 12 carbon atoms.

13. The powder coating composition of claim 1 wherein component B) comprises one or more polyol-modified polyanhydrides of aliphatic dicarboxylic acids having 4 to 12 carbon atoms, said polyanhydrides containing acid anhydride and carboxyl groups in a molar ratio of 1:1 to 3:1.

14. The powder coating composition of claim 2 wherein component B) comprises one or more polyol-modified polyanhydrides of aliphatic dicarboxylic acids having 4 to 12 carbon atoms, said polyanhydrides containing acid anhydride and carboxyl groups in a molar ratio of 1:1 to 3:1.

15. The powder coating composition of claim 3 wherein component B) comprises one or more polyol-modified polyanhydrides of aliphatic dicarboxylic acids having 4 to 12 carbon atoms, said polyanhydrides containing acid anhydride and carboxyl groups in a molar ratio of 1:1 to 3:1.

16. The powder coating composition of claim 4 wherein component B) comprises one or more polyol-modified polyanhydrides of aliphatic dicarboxylic acids having 4 to 12 carbon atoms, said polyanhydrides containing acid anhydride and carboxyl groups in a molar ratio of 1:1 to 3:1.

17. A coated heat-resistant substrate coated with the powder coating composition of claim 1.

18. A coated heat-resistant, automotive substrate coated with the powder coating composition of claim 1.

\* \* \* \* \*